(No Model.)
H. H. WING.
MANUFACTURE OF CEMENT.
No. 455,376. Patented July 7, 1891.
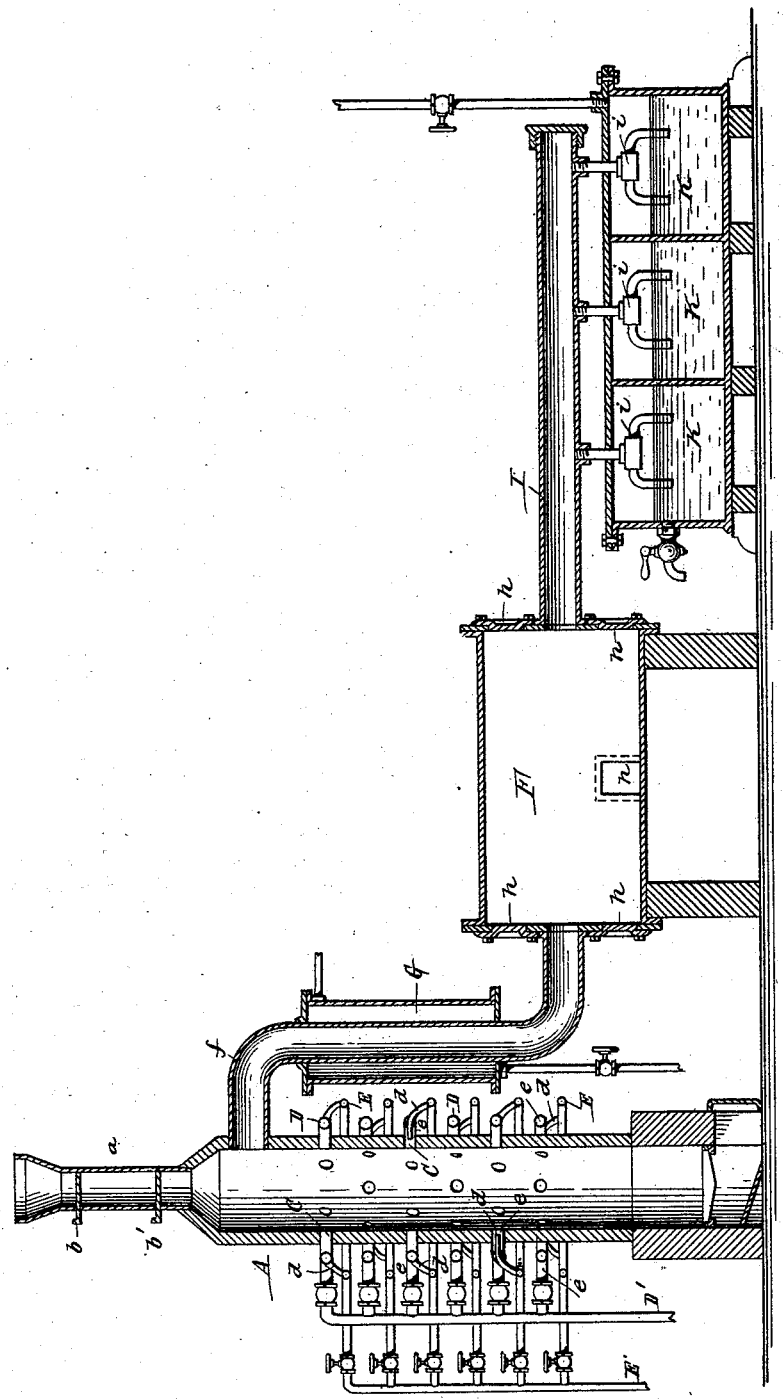
Witnesses:
Emil Neuhart.
Theo. L. Popp.
H. H. Wing  Inventor.
By Wilhelm Bonner
Attorneys.

UNITED STATES PATENT OFFICE.

HERBERT H. WING, OF BUFFALO, NEW YORK.

MANUFACTURE OF CEMENT.

SPECIFICATION forming part of Letters Patent No. 455,376, dated July 7, 1891.

Application filed November 1, 1890. Serial No. 370,080. (No specimens.)

*To all whom it may concern:*

Be it known that I, HERBERT H. WING, a citizen of the United States, residing at the city of Buffalo, in the county of Erie and State of New York, have invented a new and useful Improvement in the Manufacture of Cement, of which the following is a specification.

This invention has for its object the manufacture of cement in such manner that phosphorus is produced as a by-product.

The accompanying drawing represents a sectional elevation of an apparatus which may be used in practicing my invention.

I mix together very finely-ground phosphate rock—for instance, calcium phosphate—and any suitable silicious material—such, for instance, as clay or serpentine—also finely ground. The powdered phosphate is mixed with the silicate in such proportion that the resulting calcined mass has about the composition of lime sixty per cent., silica twenty-two per cent., and alumina ten per cent. To obtain this result with phosphate rock and clay, one hundred parts of phosphate rock are mixed with 46.29 parts of clay; but these proportions may be varied as the compositions of the materials vary. The proportions must be such, however, that the phosphate exceeds the silicate to such an extent that the lime and silica are present in the proportion of about three to one, so that a basic silicate of lime, or of lime and alumina, or of lime and magnesia, is produced, as an acid silicate is not capable of use as cement. The mixture of the phosphate with the silicate is dampened and molded into small balls about two inches in diameter. These balls are dried, and then calcined at an extremely-high temperature. To obtain this high temperature, I prefer to employ a cupola-furnace A, which is preferably heated with gaseous fuel and a hot-air blast. This furnace is provided at the top with a feed-pipe $a$, having two slides $b\ b'$, and at the bottom with a dumping-grate or other device by which the calcined mass can be removed. The above-described balls are placed in the furnace in layers, and between the layers of balls is placed coke or coal, whereby incandescent carbon is furnished for the reduction of the phosphoric-acid fumes.

The furnace is provided with radial gas-burners C arranged in horizontal rows, and composed each of an internal air-pipe $d$, and a surrounding gas-pipe $e$, which are supplied with air and gas, respectively, from horizontal annular pipes D E and vertical supply-pipes D' E'. The supply of gas is so regulated as to produce a reducing action as distinguished from an oxidizing flame. At the high temperature of calcination the silica in the silicate expels the phosphoric acid from the phosphate. The acid is driven out in the form of anhydride $P_2O_5$. The action of the reducing flame, together with the action of the incandescent carbon, reduces the phosphoric anhydride to phosphorus, the oxygen combining with the carbon. I prefer to use solid carbonaceous matter—such as coal or coke—to produce this reducing action; but it may be produced in a less desirable manner by the gaseous fuel alone under a proper limitation of the air-supply. Liquid or solid fuel may be employed instead of gaseous fuel, if desired; but I prefer gaseous fuel because it produces more concentrated fumes. The fumes of phosphorus pass from the furnace through a pipe $f$ to a depositing-chamber F, in which the temperature of the fumes is reduced to about 500° Fahrenheit, at which temperature the fumes change to the form of red phosphorus, which is deposited. This reduction of the temperature can be effected by locating the depositing-chamber at such a distance from the furnace that the radiation through the iron pipe $f$ and the iron walls of the depositing-chamber produces the desired cooling; or the conducting-pipe $f$ can be surrounded with a water-jacket G, by which the fumes are cooled. The depositing-chamber is provided with a number of doors or man-holes $h$, through which the red phosphorus is removed. The fumes which are not changed in the depositing-chamber to red phosphorus pass through the pipe I and issue from depending branch pipes $i$ into water-chambers K, in which the mouths of these pipes are submerged. These chambers are of the construction usually employed in the manufacture of phosphorus, and two or more series of these chambers are employed, as may be necessary, to condense the fumes completely before the waste gases are permitted to escape.

The yellow phosphorus which is deposited in these chambers is removed therefrom in a well-known manner. The calcined mass which is removed from the bottom of the furnace has the composition of hydraulic or Portland cement, and is ground to make it ready for use. There is, therefore, no waste or fusible slag produced, and the production of phosphorus simultaneously with the cement materially reduces the cost of the process or increases the value of the product.

I am aware that it is not new to make phosphorus by calcining a mixture composed of a phosphate and a silicate, in which the silicate exceeds the phosphate, and whereby an acid silicate is produced which is in most cases a fusible slag, but sometimes non-fusible; but in either case is incapable of use as cement.

I claim as my invention—

1. The herein-described method of producing hydraulic or Portland cement, which consists in calcining a mixture composed of a phosphate and a silicate, in which the phosphate exceeds the silicate in the proportion specified, whereby a basic silicate is produced which has the compssition of hydraulic or Portland cement, substantially as set forth.

2. The herein-described method of producing hydraulic or Portland cement and phosphorus simultaneously, which consists in calcining a mixture composed of a phosphate and a silicate, in which the phosphate exceeds the silicate in the proportion specified, whereby a basic silicate is produced, and condensing the resulting fumes of phosphorus, substantially as set forth.

Witness my hand this 29th day of October, 1890.

HERBERT H. WING.

Witnesses:
 CARL F. GEYER,
 FRED. C. GEYER.